March 10, 1970

J. B. JAMES 3,500,345

INFORMATION STORAGE APPARATUS EMPLOYING
MAGNETIC STORAGE ELEMENTS

Filed Nov. 5, 1963

INVENTOR
JOHN BERNARD JAMES
BY Hane and Nydick
ATTORNEYS

United States Patent Office 3,500,345

Patented Mar. 10, 1970

3,500,345
INFORMATION STORAGE APPARATUS EMPLOYING MAGNETIC STORAGE ELEMENTS

John Bernard James, London, England, assignor to International Computers and Tabulators Limited Filed Nov. 5, 1963, Ser. No. 321,469
Claims priority, application Great Britain, Nov. 8, 1962, 42,240/62
Int. Cl. G11b *5/00*
U.S. Cl. 340—174 2 Claims

ABSTRACT OF THE DISCLOSURE

A thin magnetic film storage device has a number of film areas for storage of information. Magnetic fields are applied to the storage areas by means of switch cores coupled by closed loop conductors to the storage areas. The switch cores are arranged in rows and columns and are selectively switched by energisation of row and column conductors threading the cores. In order to simplify the construction of the store, the portions of the loop conductors passing through the switch cores are common to the row conductors. The cores may be mounted in apertures in the substrate which carries the thin film areas and the loop conductors and row conductors are formed by printed circuit techniques, the loop conductors embracing the substrate and passing from one face to the other face of the substrate through the hole in the core. The substrates are stacked and the column conductors threaded through the cores.

Figures 1, 4:
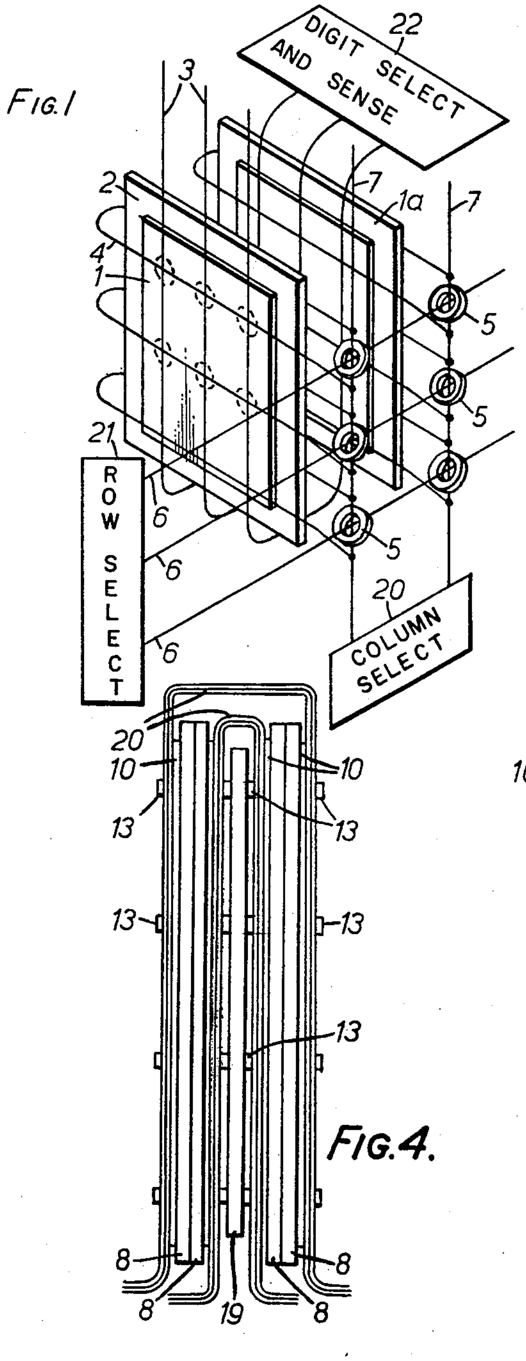

This invention relates to information storage apparatus employing magnetic storage elements.

It has previously been proposed to provide information storage apparatus in which anisotropic thin ferromagnetic films supported on substrates are magnetically coupled to driving conductors. Storage devices fo this kind are commonly arranged to operate in a so-called "word-organised" mode. In this mode of operation sets of word conductors and of digit conductors are provided, usually arranged at right angles, and a group of film storage areas constituting a word address is selected by the energisation of a single word conductor, the individual areas of the group each being set to a required state by the selective energisation of the digit conductors. Thus the film supported on a single substrate is arranged to store a number of words each consisting of individual digit representations, the representations being arranged in matrix formation, and a complete storage device may be built up by using a number of substrates each supporting a film. Such a store is logically equivalent to a word organised matrix store using individual ferrite cores.

It has also been proposed to control the energisation of the word conductors of such a complete storage device by the selective switching of a number of bistable ferromagnetic switch cores, one core being individually associated with each of the word conductors. The switch cores themselves may also be arranged in matrix formation and an individual core may then be selected to be switched by conventional coincident current selection techniques. However, where the number of switch cores is large the problem of threading driving conductors through the core matrix is considerable and is aggravated by the requirement, for example, that the use of relatively low power transistor selection circuits for generating the required switching currents may necessitate the threading of control windings more than once through each core. Furthermore, the connection of the switch core matrix to the word conductors of the storage device has previously involved separate soldering operations for each word conductor and where the number of these conductors is large, this operation is tedious and time-consuming. It is desirable, therefore, to reduce or eliminate the number of soldered connections required to assemble the completed storage device.

It is the object of the present invention to provide an improved address selection arrangement for energising the word conductors of an information storage device.

According to the invention a storage address selection arrangement includes a plurality of magnetic switch cores, a plurality of first conductive elements, each passing through one of the switch cores and being magnetically coupled thereto, a second conductive element, in the form of a loop magnetically coupled to a plurality of magnetic storage elements, connected across each of the first conductve elements, and means for switching any selected one of the switch cores by applying a drive current to at least the first conductive element coupled to said one core.

Apparatus embodying the invention will now be described, by way of example, with reference to the accompanying drawing, in which, FIGURE 1 shows, in diagrammatic form, a switch core word addressing arrangement of a thin film storage device.

Figure 3:
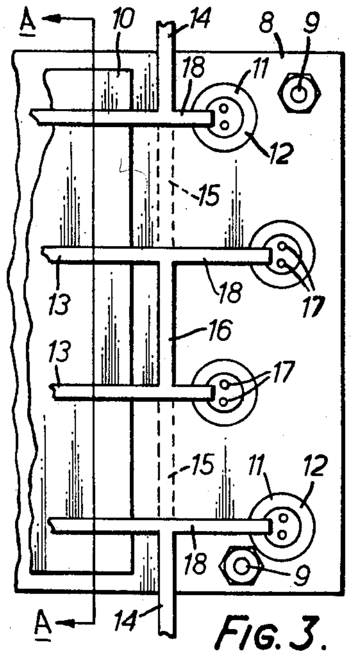
Figure 2:
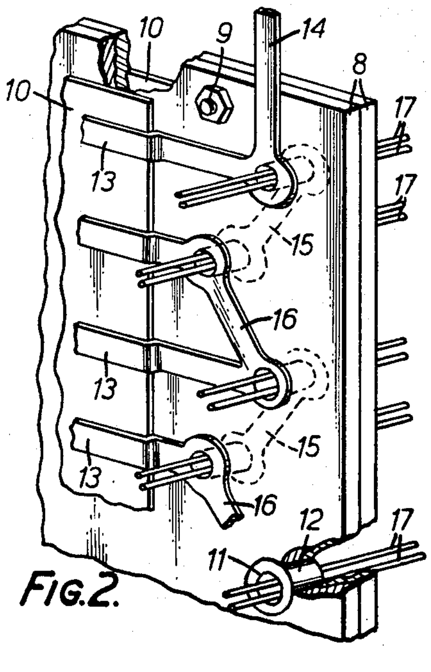

FIGURE 2 shows the arrangement of switch core connections for a pair of film supporting substrates in greater detail, FIGURE 3 is an elevation of an alternative arrangement of switch core connections, FIGURE 4 is a sectional view of a stack of film supporting substrates.

The relationships of the various parts of a thin film information storage device are shown diagrammatically in FIGURE 1. An area of anisotropic thin ferromagnetic film is supported by a substrate 2. Individual binary digit storage areas of the film 1 are defined by the interaction of magnetic fields produced by the electrical energisation of digit drive lines 3 and of word drive lines 4, so that each word drive line 4 defines the location of a strip of the film 1 in which lie all the elementary individual digit storage areas (indicated by dotted lines) associated with a single word of information. The energisation of the digit drive lines is controlled by a conventional digit selection circuit 22 and the energisation of the word drive lines is controlled by switching of a ferromagnetic switch core 5. A separate switch core 5 is provided for each word line 4.

Further substrates, such as 1*a*, may be provided and these substrates also support areas of thin storage film. These additional substrates also have associated word drive lines which are coupled to further switch cores 5. The digit drive lines may be common to a number of substrates and may be interwoven between them so that they are magnetically coupled to corresponding digit positions in all word storage locations.

Instead of the arrangement of substrates shown in the figure, the substrates may be mounted back-to-back in pairs and in this case each word drive line 4 may be looped round both substrates of a pair to link with two word storage locations. In this case two sets of digit drive lines 3 are used, the two word storage locations associated with a word drive line being linked to different digit drive line sets. It will be appreciated that although only three digit drive lines and three word drive lines are shown in FIGURE 1, in a practical device there will be a much greater number of both.

In order to read out information stored in the elementary digit storage areas of film, the digit drive lines may be used as sensing lines during reading out or, alternatively, further sensing or output, lines may be provided in addition to the lines 3 shown in FIGURE 1. These output lines are conveniently arranged to follow the same path as that taken by the digit drive lines. The arrangement of a film storage device in this way lends itself to the employment of strip conductors for the driving and sensing lines. In particular the digit drive lines and sensing lines are conveniently preformed on flexible tapes by printed circuit techniques U.S. Patent 3,201,767 shows and describes in detail a thin film storage device using digit driving and sensing lines applied in serpentine fashion to pairs of film-supporting substrates in this way. U.S. Patent 3,200,383 shows a similar arrangement including a word drive line comprising a strip conductor in the form of a loop which is linked with a switch core by means of a length of wire passing through the aperture of the core, the core being selected in conventional manner by row and column windings.

As shown in FIGURE 1, however, the word drive conductor 4 of the present invention does not have a separate wire linking with the switch core 5. Instead, the word drive conductor is connected to the column winding 7 on each side of the switch core 5. Thus, the portion of conductor actually passing through the aperture of the core 5 is common to both the core selection column winding 7 and the word drive conductor 4. One switch core is switched, as described in the application referred to, by concurrent energisation of a row winding 6 and a column winding 7, by row and column selector circuits 21 and 20. The switching of this core induces a current in the closed circuit formed by the word drive loop 4 associated with the core and the portion of the column winding 7 across which the loop is connected. Hence, the selection of a core 5 to be switched selects the address within the thin film storage device at which the required word is to be stored by energising the associated word drive conductor. It will be appreciated that the operations of writing into and reading out of the selected address then take place as described in detail in the application referred to above.

Since the selection of a required address is seen to be dependent upon switching of a selected core 5, it will be appreciated that other ways of controlling switching of the required core 5 will perform a similar address selecting operation. For example, the switch cores 5 may merely be used to control the generation of the requisite word driving current and in this case the row and column windings may be replaced by a single switching winding, the selection of the required core being performed, for example, by means of a decoding network which produces an output only on the required switching winding. In this case, the word drive conductor 4 is connected to the switching winding of the associated core 5 in the same way as for the winding 7 shown in FIGURE 1. Equally, the selection of a single switch core from a matrix of cores may be performed in other well-known ways. In some cases, for example, it may be required to perform a form of coincident current switching using a bias winding and in this case additional windings may be threaded through each core 5.

The schematic arrangement of FIGURE 1 shows a continuous column winding 7 with the open ends of the word loop 4 connected across the portions of the winding which are magnetically coupled to the cores. It will be apparent that an electrically equivalent result is provided by forming the word drive conductors as closed loops and connecting in series those portions which are coupled to the switch cores to form the drive winding. These portions may be connected directly together, or by separate conductors, depending upon the distance between adjacent conductors 4.

The arrangement has been described in relation to a thin film store employing a particular mode of operation, but it will be appreciated that the invention is generally applicable to cases in which it is desired to induce a drive current in a loop magnetically coupled to a plurality of magnetic storage elements.

Cores such as the switch cores 5 are susceptible to mechanical damage during assembly if supported only by the matrix wiring and it is preferable that they should be firmly supported. FIGURE 2 shows the construction of part of a thin film memory device with provision for supporting the cores. A pair of substrates 8 are supported back-to-back by screws and nuts 9. Each substrate carries a thin ferromagnetic storage film 10 on its outer face. The substrates 8 extend beyond the edges of the films 10 and in one of the clear margins of the substrates 8 a series of holes 11 are pierced. The holes in both substrates of the pair coincide and a switch core 12, corresponding to one of the switch cores 5 of FIGURE 1, is inserted. The switch cores are preferably secured in position in the holes by coating them with an adhesive, for example, one of the commercially available synthetic resin adhesives. Word drive conductors 13, corresponding to conductors 4 (FIG. 1), are formed by conventional printed circuit techniques on both sides of the substrate pair, so that each conductor 13 passes round the substrates in loop formation and ends as an annulus about the ends of the associated core. The word driving circuit is continued to form a completely closed loop by plating through the aperture of the core to connect together the annular formations on either side of the substrate pair. From the first core position at one end of the series an additional tail 14 is formed on one side of the substrate pair. On the reverse side of the pair an additional strap connection 15 is formed, as indicated by dotted lines in the figure, between the first and second positions of the series, and this strap formation 15 is also provided between the third and fourth positions and so on. Similar strap formations 16 are also provided on the obverse side of the pair between alternate pairs of positions so that a further conductive path is formed threading all the cores 12 in series. At the end of the series of core positions a final tail, similar to the tail 14 is formed, and the series circuit between these tails thus forms a core selecting conductor corresponding to the conductor 7 of FIGURE 1. Hence, not only does the method of construction shown in FIGURE 2 provide means for mounting the switch cores 12 rigidly in the substrates 8, but word conductors and one of the core selecting conductors are formed without the use of soldered joints. Additional core selecting windings such as 17 may be threaded through the apertures in the cores in the usual way. Such windings may be row windings, corresponding to the windings 6 of FIGURE 1, for example, or bias windings in dependence upon the mode of selection of the switch cores 12 to be employed. When a large number of substrate pairs are required to form a large storage device, the substrates are all supported so that the core apertures are aligned, thus rendering the operation of threading the additional windings considerably easier than if the cores are tilted with respect to the threading windings as is the case with conventional core matrices in which the cores are supported by the selection wiring.

It will be appreciated that in order to isolate the conductor formation from the storage film a layer of insulation is formed over the surfaces of the substrates and films before the conductor pattern is laid down. For the sake of clarity, however, this insulating layer has been omitted from the drawing. The relative dimensions of the various component parts of the structure have been distorted in order to show the details of the structure more clearly and in consequence the drawing should not be regarded as indicative of the relative sizes of the parts. Under some circumstances the substrates 8 which support the films are made of conductive material and in this case the coating of adhesive on the switch cores 12 serves to isolate the cores from the substrates.

FIGURE 3 shows an alternative method of construction and similar parts of FIGURES 2 and 3 are referenced with similar numbers. Again, it will be appreciated that insulation is omitted, for the sake of clarity, from FIGURE 3. A pair of substrates 8 support storage films 10 and are provided with a series of apertures 11 supporting switch cores 12. A conductor pattern includes word drive conductors 13 and a column conductor consisting of tails 14 and straps 15 and 16 formed on the outer surfaces of the substrates. Extensions 18 of the word drive conductors are formed through the apertures of the cores 12. The portion of extension 18 passing through the aperture of a core is then common to the serially connected column winding including elements 14, 15 and 16, and to the word drive conductor 13 associated with the core. A process for forming a conductor through the aperture of a core supported in a hole in a substrate is shown and described in detail in an article entitled "Three-dimensional Printed Wiring" by E. A. Guiditz, published in the journal "Electronics" for June 1, 1957.

Additional core selecting windings 17 are threaded through the apertures in the cores 12 as previously described. A large storage device may be built up by clamping a number of pairs of substrates together by means of bolts and nuts 9. It has been found that the performance of a large device built up in this way is improved by providing conductive plates 19 between adjacent pairs of substrate 8 as shown in FIGURE 4. This figure, which is a sectional view of the device taken along line A—A of FIGURE 3, also shows the films 10 carried by the substrates 8, the word drive conductors 13 and the serpentine arrangement of digit driving and sensing conductors 20 described in detail in the co-pending application previously referred to. The substrates are clamped together with the interleaved conductive plates to form a single self-supporting structure and corresponding core apertures in the individual substrate pairs are aligned so that threading the additional windings is simplified. The conductive plates preferably extend almost over the entire surfaces of the substrates and are punched with a pattern of holes corresponding to the core supporting apertures so that the additional windings pass through the interleaving plates as well as the switch cores.

What is claimed is:

1. Information storage apparatus including a first conductor; a plurality of magnetic switch cores, each having a passageway extending therethrough, threaded on the first conductor and spaced apart along the first conductor; a planar substrate carrying a plurality of areas of thin magnetic film on a face thereof; said substrate having a plurality of apertures each containing a different one of said switch cores respectively; said first conductor consisting of a plurality of conductive strips extending between adjacent cores, alternate strips being on opposite faces of the substrate and all the strips being connected together in series by plated connections extending through the passageways of the switch cores; a plurality of second conductors each electromagnetically linked with a different one of said areas of magnetic film respectively and each having two ends; the second conductors having the form of open ended loops embracing the substrate with the two ends thereof respectively located on opposite faces of the substrate; each second conductor being connected at its ends to the first conductor immediately adjacent to and on opposite side of a different one of said switch cores respectively; and selection means, including a source of drive current operable to energise said first conductor, operable to switch said magnetic cores selectively, switching of any one of said cores being effective to induce a current in that second conductor which has its ends connected to the first conductor on opposite sides of the switched core.

2. Information storage apparatus including a first conductor; a plurality of magnetic switch cores threaded on the first conductor and spaced apart along the conductor; a plurality of areas of thin magnetic film; a pair of planar substrates each having a like plurality of apertures and mounted face to face with the apertures of one substrate aligned with the apertures of the other substrate; said switch cores being mounted one in each pair of aligned apertures respectively; a first group of said areas of magnetic film carried on the outer face of one substrate and a second group of said areas of magnetic film carried on the outer face of the other substrate; the first conductor consisting of a plurality of conductive strips extending between adjacent cores, alternate strips being located on opposite outer faces of the substrates, all the strips being connected in series by plated connections extending through the switch cores; a plurality of second conductors each electromagnetically linked with a different one of said areas of magnetic film respectively and having two ends; the second conductors having the form of open ended loops embracing the pair of substrates with the two ends thereof located on opposite outer faces of the substrates adjacent the switch cores; each second conductor being connected, at its ends, to the first conductor immediately adjacent to and on opposite sides of a different one of said switch cores respectively; and selection means, including a source of drive current operable to energise said first conductor, operable to switch said magnetic switch cores selectively, switching of any one of said cores being effective to induce a current in that second conductor which has its ends connected to the first conductor on opposite sides of the switched core.

References Cited

UNITED STATES PATENTS

| | | | |
|---|---|---|---|
| 2,979,700 | 4/1961 | Tellefsen | 340—174 |
| 3,075,184 | 1/1963 | Warman | 340—174 |
| 3,144,641 | 8/1964 | Raffel | 340—174 |
| 3,156,905 | 11/1964 | Stram | 340—174 |
| 3,200,383 | 8/1965 | James | 340—174 |
| 3,273,134 | 9/1966 | Lemaine | 340—174 |
| 3,305,726 | 2/1967 | Goodman | 302—88 |

JAMES W. MOFFITT, Primary Examiner